United States Patent
Brewer et al.

(10) Patent No.: US 10,534,087 B1
(45) Date of Patent: Jan. 14, 2020

(54) DIFFERENTIAL VECTOR PHASE LOCKED LOOP GPS RECEPTION METHOD

(71) Applicant: Government of the United States as represented by the Secretary of the Air Force, Wright-Patterson AFB, OH (US)

(72) Inventors: James J Brewer, Tularosa, NM (US); John F Raquet, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 127 days.

(21) Appl. No.: 15/169,686

(22) Filed: May 31, 2016

Related U.S. Application Data

(60) Provisional application No. 62/168,840, filed on May 31, 2015.

(51) Int. Cl.
*G01S 19/25* (2010.01)
*G01S 19/04* (2010.01)
(Continued)

(52) U.S. Cl.
CPC ............ *G01S 19/256* (2013.01); *G01S 19/04* (2013.01); *G01S 19/05* (2013.01); *G01S 19/29* (2013.01);
(Continued)

(58) Field of Classification Search
CPC .......... G01S 19/04; G01S 19/05; G01S 19/06; G01S 19/22; G01S 19/252; G01S 19/256;
(Continued)

(56) References Cited

U.S. PATENT DOCUMENTS 5,935,194 A * 8/1999 Talbot ..................... G01S 19/44
342/457
6,313,789 B1 11/2001 Zhodzishky et al.
(Continued)

FOREIGN PATENT DOCUMENTS

WO WO2009125011 A1 10/2009

OTHER PUBLICATIONS

J. Brewer et al., Differential Vector Phase Locked Loop, IEEE Transactions on Aerospace and Electronic Systems, vol. 52(3), p. 1046-1055, Jun. 2016 (Year: 2016).*

*Primary Examiner* — Bernarr E Gregory
*Assistant Examiner* — Fred H Mull
(74) *Attorney, Agent, or Firm* — Matthew D. Fair; AFMCLO/JAZ

(57) ABSTRACT

A method for enhancing GPS location accuracy includes providing a base station receiver having a known surveyed location, and a roving receiver at a location distinct from the base station receiver. The method further includes receiving single-frequency code and carrier-phase measurements from the base station, and translating the single-frequency code and carrier-phase measurements to a Kalman filter-predicted location of the roving receiver. The translated single frequency code and carrier phase measurements are used to generate a local replica of the Kalman filter-predicted location signals for each channel of the roving receiver. The method further includes correlating the local replicas with an incoming signal of the roving receiver to generate a plurality of tracking error estimates. The plurality of tracking error estimates are used to update navigation states and clock update states thereof. The method also includes estimating delta tb1 and discarding local channel information prior to performing subsequent iterations.

5 Claims, 9 Drawing Sheets

(51) Int. Cl.
  *G01S 19/05* (2010.01)
  *G01S 19/43* (2010.01)
  *G01S 19/29* (2010.01)
  *G01S 19/44* (2010.01)
  *G01S 19/51* (2010.01)

(52) U.S. Cl.
  CPC .............. *G01S 19/43* (2013.01); *G01S 19/44* (2013.01); *G01S 19/51* (2013.01)

(58) Field of Classification Search
  CPC ..... G01S 19/29; G01S 19/43–44; G01S 19/51
  See application file for complete search history.

(56) References Cited

U.S. PATENT DOCUMENTS

| | | | |
|---|---|---|---|
| 7,495,607 B1 | 2/2009 | Zhodzishky et al. | |
| 2001/0002458 A1* | 5/2001 | Kohli | G01S 19/29 |
| | | | 701/468 |
| 2002/0105458 A1* | 8/2002 | Dooley | G01S 19/29 |
| | | | 342/357.62 |
| 2006/0140254 A1* | 6/2006 | Pietila | G01S 19/22 |
| | | | 375/147 |
| 2009/0189804 A1* | 7/2009 | Ashjaee | G01S 19/44 |
| | | | 342/357.27 |

* cited by examiner

DIFFERENTIAL VECTOR PHASE LOCKED LOOP GPS RECEPTION METHOD

Pursuant to 37 C.F.R. § 1.78(a)(4), this application claims the benefit of and priority to prior filed Provisional Application Ser. No. 62/168,840, filed 31 May 2015 which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to global navigation satellite systems and, more particularly, to methods of obtaining enhanced accuracy and resistance to noise signals in dynamic motion applications.

BACKGROUND OF THE INVENTION

Global positioning systems (GPS) have revolutionized many aspects of navigation, surveying, high accuracy timing, weapon guidance, customized electronic marketing techniques, and the like. GPS is essentially a system of earth-orbiting satellites that transmit signals continuously to earth. A receiving device on or near the earth's surface receives those signals, and data contained therein, and calculates the distance from the receiving device to each of (at a minimum) four satellites. With knowledge of the transmission time, receipt time, and orbital path of each of the four satellites, the receiver can calculate its three dimensional location in earth's space.

Early embodiments of GPS restricted the use of high accuracy three dimensional location to military and authorized surveying applications by intentionally introducing error into the navigational signals. While this intentionally introduced error has been removed for over a decade, a GPS receiver still experiences error by way of ionospheric and tropospheric aberrations, ephemeris, natural and artificial interference signals, timing and arithmetic error, etc.

Several techniques have been employed to account for the aforementioned sources of accuracy error, and thus yield more precise location measurements. For example, geometric correlation of GPS satellite vehicle (SV) signals, and vector delay locked loop (VDLL), were used as early accuracy enhancement techniques.

Vector tracking has seen a flurry of activity in the wake of geometric correlation and VDLL. Taking advantage of the spatial correlation between satellites has opened vast frontiers of research. Vector tracking loops are characterized by their exploitation of the geometric correlations between satellite tracking channels. For example, if two satellites are close together in the sky, and a receiver moves towards one, it will also have projected motion towards the other. This is the geometric correlation that is leveraged in a vector tracking loop. Satellite-to-satellite geometric correlation is reflected in the nondiagonal terms of the geometry matrix. In general, these nondiagonal terms are nonzero, resulting in correlation between satellites. If more than one frequency is tracked, vector tracking loops also take advantage of spectral correlations among the different signals from each satellite. Scalar tracking loops ignore these correlations. To date, vector tracking research has focused on obtaining real-time solutions without the benefit of precise base station measurements.

Ignoring receiver clock bias, the errors that affect a GPS receiver are normally on the order of a few meters or so. This level of error is much less than the code length (300 m for GPS coarse acquisition [CA] code) and is slowly changing, making vector tracking a realistic solution for the code loop and for the carrier when using a frequency locked loop. However, a few meters is much larger than the wavelength of the carrier (19 cm for GPS L1), making vector phase tracking a challenging proposition. For pure vector phase tracking to be viable, the errors that affect the phase must be mitigated.

For this reason, many vector tracking techniques use a VDLL with a scalar phase locked loop or a VDLL with a vector frequency locked loop (VFLL). Many VDLL/VFLL methods also use scalar phase locked loops.

One technique is scalar in the delay locked loop (and is not a pure vector phase locked loop (VPLL)), with the carrier loop split into two parts, the high-frequency portion is tracked in vector mode, and the low-frequency portion tracked in scalar mode. Others techniques may obtain vector phase lock by estimating and removing atmospheric errors and any initial biases. The individual channel phase discriminator outputs are transformed, using weighted least squares, into position and atmospheric errors. Each error is individually filtered and back transformed to the individual satellite domain to steer the replica carrier.

Using such an approach, periodic reinitialization of the phase biases must be performed if the satellite clock and position errors become too large. This essentially keeps these methods from being pure vector phase locked. These errors can be obviated for implementations with access to precise orbits (e.g., network access for a real-time application or a postprocessed application). However, severe phase multipath affecting all satellites simultaneously is potentially more detrimental to the VPLL than correctable satellite clock and position errors. Since these methods are scalar in the delay locked loop, they require dual-frequency receivers to estimate and remove ionospheric errors.

Other techniques implemented a VDLL/VPLL method by using a Kalman filter to estimate the replica carrier and code of each SV, using all available data. At the same time, the atmospheric errors and receiver clock terms and their derivatives are also estimated. In some embodiments, the Kalman filter also contains states to estimate the receiver's position and derivatives. Again, this method is not pure vector phase locked, since individual-channel biases are accounted for and removed in the Kalman filter. As before, these methods require dual-frequency receivers to estimate and remove ionospheric errors.

None of the aforementioned VPLL techniques uses differential carrier-phase measurements directly in the vector phase loop. Instead, they rely on a postprocessing integer ambiguity technique to get a highly accurate baseline estimate. While more robust at tracking phase than scalar techniques, these methods still do not reach the full potential of pure vector phase tracking.

Others have attempted to use differential corrections directly in the vector tracking loops, however, prior art corrections are limited to code-phase and carrier-frequency measurements vice carrier-phase measurements. Carrier-phase measurements must be used to obtain an ambiguity-resolved differential carrier-phase quality solution directly in the tracking loop.

However, each of the prior are techniques are ineffective at providing an ambiguity-resolved differential carrier-phase quality solution directly in the tracking loops while simultaneously operating in an environment of high-dynamics, noisy signals and intermittent contact with satellite vehicles. As a result, there exists a need in the art for a method of improving spatial location accuracy in dynamic acceleration environments that is also robust to noise signals and intermittent contact with satellite vehicles.

SUMMARY OF THE INVENTION

The present invention overcomes the foregoing problems and other shortcomings, drawbacks, and challenges of obtaining high spatial resolution while rejecting external noise in a dynamically accelerating roving GPS receiver. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a method for enhancing GPS location accuracy is provided. The method includes providing a base station receiver having a known surveyed location, and providing a roving receiver at a location distinct from the base station receiver. The method further includes receiving single-frequency code and carrier-phase measurements from the base station, and translating the single-frequency code and carrier-phase measurements to a Kalman filter-predicted location of the roving receiver. The translated single frequency code and carrier phase measurements are used to generate a local replica of the Kalman filter-predicted location signals for each channel of the roving receiver. The method further includes correlating the local replicas with an incoming signal of the roving receiver to generate a plurality of tracking error estimates. The plurality of tracking error estimates are used to update a plurality of navigation states and a plurality of clock update states thereof. The method also includes estimating $\Delta t_{B1}$ and discarding local channel information prior to performing subsequent iterations.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

A new method of realizing a vector phase locked loop is provided herein that incorporates differential corrections directly in the tracking loops of the receiver. An embodiment of the disclosed method was used to process L-only GPS data collected from static antennas at a known baseline. The 3D accuracy of the baseline measurements was 5 mm which is comparable to ambiguity resolved differential phase techniques.

According to embodiments of the disclosed invention, an accuracy enhancing and interference-resistant method has been applied in a test and evaluation environment wherein sampled intermediate-frequency (IF) global navigation satellite system (GNSS) data can be postprocessed. More specifically, in accordance with embodiments of the disclosed inventive method, base station measurements can be used in a differential vector phase locked loop (DVPLL) method to obtain a position solution directly in the vector tracking loop of a rover receiver that has an accuracy comparable to an integer-resolved carrier-phase differential GPS solution. The DVPLL may generate its base-to-rover carrier-based solution within its vector tracking loop.

Figure 1:
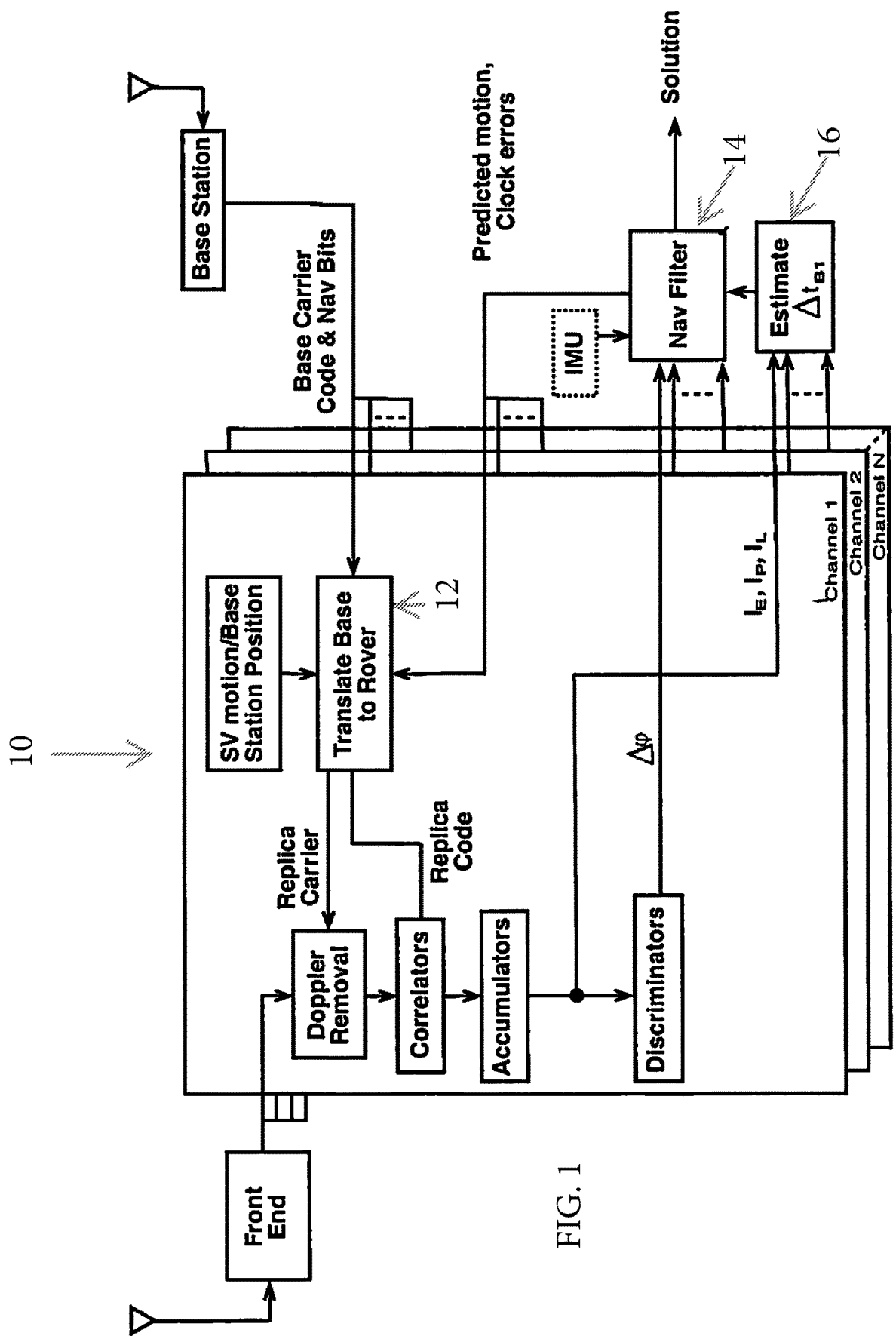
FIG. 1 is a flowchart in accordance with embodiments of the disclosed differential vector phase locked loop method.

Turning attention to the appended figures, FIG. 1 shows a flowchart of an embodiment of the DVPLL method 10. Starting in the upper-right corner of the figure, the code and carrier-phase measurements obtained from a receiver at a surveyed location (base station) are translated to a Kalman filter-predicted location of a receiver at a different location (rover). The translated code- and carrier-phase measurements are used to generate local replicas of the predicted signals for each channel of the rover. These replica signals are correlated with the incoming signal obtained at the rover to generate tracking error estimates. The errors are used by a Kalman filter to update its navigation state and clock offset states, thus completing the loop. The technique is purely vector in that no local channel information is saved to be used in the next iteration. For short baselines, a single-frequency front end can be used as well, since the ionospheric errors are greatly reduced in the differential processing.

Particular attention should be afforded to steps labeled "Translate Base to Rover 12," "Nav Filter 14," and "Estimate $\Delta t_{B1}$ 16." These blocks will be detailed in the following subsections.

In the discussion that follows, it should be noted that the step of translate base to rover 12, in its truncated form, may be equated with the step of translating the single-frequency code and carrier-phase measurements to a Kalman filter-predicted location of the roving receiver. Likewise, the step of nav filter 14, in its truncated form, may be equated with using the tracking error estimates to update the navigation states and the clock update state. Lasted the step of estimate $\Delta t_{B1}$ 14, in its truncated form, may be equated with estimating $\Delta t_{B1}$. Methods for implementing the remainder of the blocks will be readily apparent to one of ordinary skill in the art.

In order to use the code, carrier, and navigation data bit measurements recorded at a base station in the tracking loops of a rover, the measurements should be corrected for the base station's relative clock offset, clock drift, and range difference from the rover. This section derives the method for accomplishing this task, culminating in the final results shown in formulae (24), (27), and (31).

With respect to defining time, in the discussion that follows, signals are defined either by the GNSS system time when the signal was transmitted or the system time when the signal arrived at the receiver's antenna phase center. The system (true) time of transmission is denoted by $t_s$ and the system (true) time of arrival is denoted by $t_u$. The relationship between these two, for the ith satellite, is given by $$t_u^i = t_s^i + \Delta t^i \tag{1}$$

where $t_u^i$ equals the system time for the ith SV signal upon its arrival at the receiver (s); $t_s^i$ equals the system time signal transmitted by the ith SV (s); and $\Delta t^i$ equals the time for the signal to transit from the ith SV to the receiver (s). The transit time is given by $$\Delta t^i = \frac{r^i}{c} + \tau_{prop}^i \tag{2}$$

where $r^i$ equals the range to ith SV, accounting for Earth rotation and propagation time (m); c equals the speed of light (m/s), and $\tau_{prop}^i$ equals the propagation delay due to the troposphere and ionosphere (s).

It should be noted that the propagation delay is different for the code and carrier, since the ionosphere is a dispersive media. The code is delayed due to the ionosphere, and the phase is advanced, resulting in different values for $\tau_{prop}^i$ between code and carrier. These values will be defined as $\tau_{code}^i$ for the code and $\tau_{carr}^i$ for the carrier.

The base station and rover receiver indicated elapsed times are given by $$t_B = \frac{k_B}{f_s} \tag{3}$$

and $$t_R = \frac{k_R}{f_s} \tag{4}$$

where $t_B$ equals the base station indicated elapsed time since sample 0 (s); $t_R$ equals the rover indicated elapsed time since sample 0 (s); $k_B$ equals the base station sample number (samples); $k_R$ equals the rover sample number (samples); and $f_S$ equals the nominal sampling frequency (Hz).

The relationship between the times indicated by the base station and rover and system time is given by the following equations.

$$t_B = \int_{t_{0B}}^{t} 1 + \epsilon_B(\xi) d\xi \tag{5}$$

$$= \underbrace{\int_{t_{0B}}^{t_1} 1 + \epsilon_B(\xi) d\xi}_{t_{B1}} + \int_{t_1}^{t} 1 + \epsilon_B(\xi) d\xi \tag{6}$$

where $t_{0B}$ equals the system time of base station sample 0 (s); $t_1$ equals the system time at beginning of integration period (s); t equals the system time (s); $\epsilon_B$ equals the base station offset from nominal frequency (unitless): and $t_{B1}$ equals the base station indicated time at beginning of integration period (s).

For a certain time interval $\epsilon_B$ is approximately constant so $$t_B \approx t_{B1} + \int_{t_1}^{t} 1 + \epsilon_B d\xi \tag{7}$$

$$\approx t_{B1} + (t - t_1)(1 + \epsilon_B) \tag{8}$$

Solving for t yields $$t \approx \frac{t_B - t_{B1}}{1 + \epsilon_B} + t_1 \tag{9}$$

Similarly, the rover indicated time is derived as $$t_R \approx t_{R1} + (t - t_1)(1 + \epsilon_R) \tag{10}$$

and $$t \approx \frac{t_R - t_{R1}}{1 + \epsilon_R} + t_1 \tag{11}$$

The measured phase, as output by a typical base station receiver, for satellite i at the base station is given by $$\phi_B^i(t_B) = \phi_T^i(t - \Delta t_B^i) - \phi_{mB}(t_B) - f_b t_B \tag{12}$$

where $\phi_T^i$ equals the signal phase at the time of transmission (cycles); $\phi_{mB}$ equals the phase of the base station mixer (cycles); and $f_b$ equals the nominal baseband frequency (Hz).

Since the mixer and sampler are in phase lock, the mixer phase can be expanded as $$\phi_{mB}(t) = \phi_{0mB} + \int_{t_{0B}}^{t} f_{mB}(\xi) d\xi \tag{13}$$

$$= \phi_{0mB} + \int_{t_{0B}}^{t} f_m(1 + \epsilon_B(\xi))d\xi \quad (14)$$

$$= \phi_{0mB} + f_m \int_{t_{0B}}^{t} 1 + \epsilon_B(\xi)d\xi \quad (15)$$

$$= \phi_{0mb} + f_m t_B \quad (16)$$

where $\phi_{0mB}$ equals the mixer phase at sample zero (cycles); and $f_m$ equals the nominal mixing frequency (Hz).

One of ordinary skill in the art will recognize that any frequency variations in (16), due to the base station receiver's clock, are captured in the $t_B$ term. Substituting (16) into (12) and using the fact that $f_m + f_b = f_{sat}$, where $f_{sat}$ is the nominal satellite frequency, yields $$\phi_B^i(t_B) = \phi_T^i(t - \Delta t_B^i) - f_{sat}t_B - \phi_{0mB} \quad (17)$$

Further substituting (9) into (17) gives $$\phi_B^i(t_B) = \phi_T^i\left(\frac{t_B - t_{B1}}{1 + \epsilon_B} + t_1 - \Delta t_B^i\right) - f_{sat}t_B - \phi_{0mB} \quad (18)$$

Similarly, the phase of the rover, without subtracting the baseband phase, yields the rover replica phase given by $$\phi_R^i(t_R) = \phi_T^i\left(\frac{t_R - t_{R1}}{1 + \epsilon_R} + t_1 - \Delta t_R^i\right) - f_m t_R - \phi_{0mR} \quad (19)$$

The $t_B$ for the ith SV, denoted $t_B^i$, is found such that the $\phi_T^i$ in (18) and (19) are at an equivalent time of transmission by setting the operands equal or $$\frac{t_B^i - t_{B1}}{1 + \epsilon_B} + t_1 - \Delta t_B^i = \frac{t_R - t_{R1}}{1 + \epsilon_R} + t_1 - \Delta t_R^i \quad (20)$$

Solving for $t_B^i$ Yields $$t_B^i = t_{B1} + \frac{1 + \epsilon_B}{1 + \epsilon_R}(t_R - t_{R1}) + (\Delta t_B^i - \Delta t_R^i)(1 + \epsilon_B) \quad (21)$$

Using the definition of $\Delta t^i$ in (2) gives $$\delta^i = \Delta t_B^i - \Delta t_R^i = \frac{r_B^i - r_R^i}{c} + \tau_{propB}^i - \tau_{propR}^i \quad (22)$$

and $$t_B^i = t_{B1} + \frac{1 + \epsilon_B}{1 + \epsilon_R}(t_R - t_{R1}) + \left(\frac{r_B^i - r_R^i}{c} + \tau_{propB}^i - \tau_{propR}^i\right)(1 + \epsilon_B) \quad (23)$$

$$= t_{B1} + (1 + \epsilon_2)(t_R - t_{R1}) + \left(\frac{r_B^i - r_R^i}{c} + \tau_{propB}^i - \tau_{propR}^i\right)(1 + \epsilon_B) \quad (24)$$

Substituting $t_B^i$ from (21) for $t_B$ in (18) yields $$\phi_B^i(t_B^i) = \phi_T^i\left(\frac{t_R - t_{R1}}{1 + \epsilon_R} + t_1 - \Delta t_R^i\right) - f_{sat}t_B^i - \phi_{0mB} \quad (25)$$

or $$\phi_T^i\left(\frac{t_R - t_{R1}}{1 + \epsilon_R} + t_1 - \Delta t_R^i\right) = \phi_B^i(t_B^i) + f_{sat}t_B^i + \phi_{0mB} \quad (26)$$

and using (19) equals $$\phi_R^i(t_R) = \phi_B^i(t_B^i) + f_{sat}t_B^i - f_m t_R - \phi_{0mR} + \phi_{0mB} \quad (27)$$

The phase measurements estimated from the base station data can be translated to the rover using (24) and (27). $\epsilon_B$ can be ignored in (24) for small baselines or accurate receiver clocks. If not, it can be estimated as well. The difference of the atmospheric errors in (24) are approximately zero for small baselines and similar altitudes. However, the differential tropospheric errors should be compensated if the altitudes are different. An appropriate tropospheric model can be used for this compensation or augmentation of the filter states to estimate the zenith tropospheric delay. Also, keep in mind that $\tau_{prop} = \tau_{carr}$ in this case.

Figure 2:
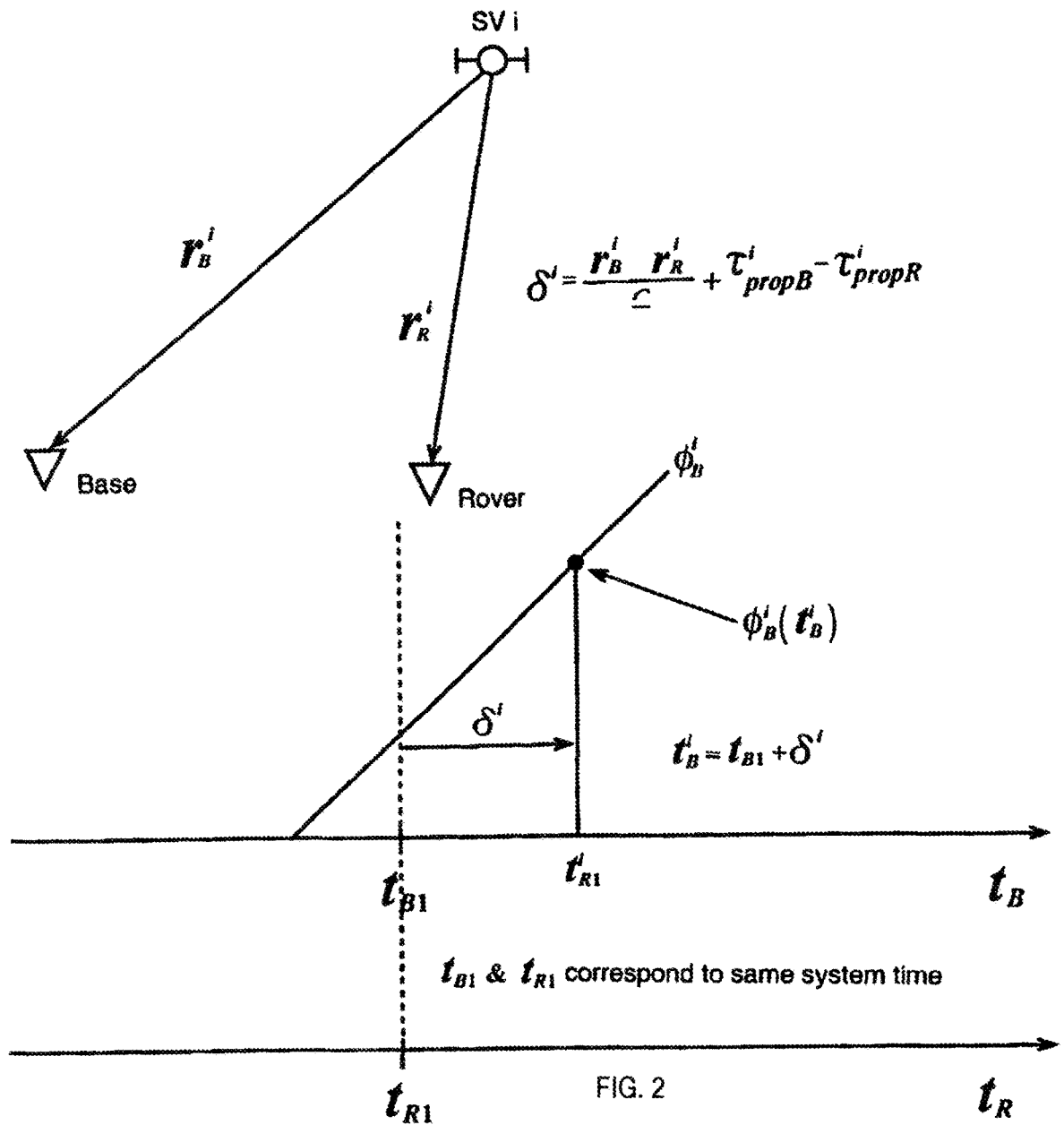
FIG. 2 is a graph illustrating relationships between the various parameters used in the disclosed method.

Equations (24) and (27) capture acceptable embodiments of this approach by enabling calculation of the phase of the rover using only the reference receiver measurements combined with knowledge of the relative position, time and frequency offsets. Equation (24) finds the base station time when the corresponding ith satellite signal was sampled by the base station. FIG. 2 shows the relationship between the various parameters in Equations (22), (24), and (27). Equation (27) takes the base station's phase measurement at this time, mixes it back up to estimate the signal at the antenna and then mixes it back down using the rover's mixer. The first term on the right side of (27) contains all the errors common to both receivers while the final two terms are the difference in phases between the two mixers at the start of sampling. This difference is the same constant for all satellites and becomes an error in the time offset estimate.

The replica code of the rover may be generated from the translated replica code of the base station. The translation is performed similar to the translation of the phase. The code time of the base station is given by:

$$tc_B^i(t_B) = tc^i(t - \Delta t_B^i) \quad (28)$$

$$= tc^i\left(\frac{t_B - t_{B1}}{1 + \epsilon_B} + t_1 - \Delta t_B^i\right) \quad (29)$$

where $tC_B^i$ equals the base station code time (s) at time t and $tC^i$ equals the code time of satellite i at time of transmission (s). Similarly, $$tc_R^i(t_R) = tc^i\left(\frac{t_R - t_{R1}}{1 + \epsilon_R} + t_1 - \Delta t_R^i\right) \quad (30)$$

Using the $t_B^i$ in (21) gives $$tc_R^i(t_R) = tc_B^i(t_B^i) \quad (31)$$

It should be noted that $\tau_{prop} = \tau_{code}$ in this case. The data bits from the base station corresponding to the same code time are used to create the rover's data bits.

The data collected were from two static receivers so a simplified Kalman filter was developed using a stationary model to demonstrate embodiments of the disclosed invention. The method does not require stationary receivers and can be easily adapted for more dynamic models and environments by augmenting the state vector. If an inertial measurement unit (IMU) is also included and properly modeled in the state equations, a very powerful deeply integrated solution can be realized. In fact, using a stationary rover is a special case of a deep integration with a perfect IMU. The following derivation uses an extended Kalman filter going through the normal propagate and update cycles.

The continuous time state model is given by $$\dot{x} = Fx + Bu + Gw \quad (32)$$

The state vector consists of the parameters to be estimated, namely $$x = [x \ y \ z \ t_{B1} \epsilon_2]^T \quad (33)$$

where x equals the rover ECEF x position (m), y equals the rover ECEF y position (m), z equals the rover ECEF z position (m), $t_{B1}$ is as defined in Equation (6) (s), and $\epsilon_2$ is defined in Equation (24) (unitless).

Since the rover is modeled as a stationary receiver, the first derivative of position is zero so $$\dot{x} = w_x \quad (34)$$

$$\dot{y} = w_y \quad (35)$$

$$\dot{z} = w_z \quad (36)$$

Where $w_x$ equals a Gaussian white noise with strength $q_x$; $w_y$ equals a Gaussian white noise with strength $q_y$; and $w_z$ equals a Gaussian white noise with strength $q_z$.

The noise is added to the model to mimic Brownian motion or a slowly wandering position. In the stationary case, it would normally be a very small value.

The Kalman filter models the rover receiver so all derivatives are taken with respect to $t_{R1}$. The derivative of $t_{B1}$ with respect to $t_{R1}$ is found by using the chain rule starting with Equation (6).

$$\frac{dt_{B1}}{dt_1} = \frac{d}{dt_1}\left(\int_{t_{0B}}^{t_1} 1 + \epsilon_B(\xi)d\xi\right) \quad (37)$$

$$= 1 + \epsilon_B(\xi)|_{\xi = t_1} \quad (38)$$

$$= 1 + \epsilon_B(t_1) \quad (39)$$

$$\frac{dt_{R1}}{dt_1} = 1 + \epsilon_R(t_1) \quad (40)$$

$$\frac{dt_{B1}}{dt_{R1}} = \frac{1 + \epsilon_B(t_1)}{1 + \epsilon_R(t_1)} = 1 + \epsilon_2(t_1) \quad (41)$$

$$\dot{t}_{B1} = 1 + \epsilon_2 + w_t \quad (42)$$

Where $w_t$ = Gaussian white noise with strength $q_t$. The last variable in the state matrix is modeled as Brownian motion $$\dot{\epsilon}_2 = w_\epsilon \quad (43)$$

where $w_\epsilon$ = Gaussian white noise with strength $q_\epsilon$.

Pulling all the equations together yields the continuous time state space model matrices $$F = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 1 \\ 0 & 0 & 0 & 0 & 0 \end{bmatrix} \quad (44)$$

$$B = G = I \quad (45)$$

$$u = [0 \ 0 \ 0 \ 1 \ 0]^T \quad (46)$$

$$w = [w_x \ w_y \ w_z \ w_t \ w_\epsilon]^T \quad (47)$$

$$E[w(t_1)w^T(t_2)] = Q\delta(t_1 - t_2) \quad (48)$$

$$Q = \begin{bmatrix} q_x & 0 & 0 & 0 & 0 \\ 0 & q_y & 0 & 0 & 0 \\ 0 & 0 & q_z & 0 & 0 \\ 0 & 0 & 0 & q_t & 0 \\ 0 & 0 & 0 & 0 & q_\epsilon \end{bmatrix} \quad (49)$$

When simulating the performance of embodiments of the disclosed invention, the values for the Q matrix were chosen such that $$q_x = q_y = q_z = 0.01^2 \text{ m}^2/\text{s} \quad (50)$$

$$q_t = 8 \times 10^{-20} f_{sat}^2 \text{ cycles}^2/\text{s} \quad (51)$$

$$q_\epsilon = 2\pi^2 (4 \times 10^{-23}) f_{sat}^2 \text{ cycles/s}^2/\text{s} \quad (52)$$

The position noise growth values were chosen to be on the order of the antenna survey's reported error after a second. The two time values were derived for an OCXO clock and were converted to cycles to avoid numerical problems during the update cycle.

The measurement equation is derived by starting with the nonlinear equation relating the state vector to the phase as $$z = h(x) + v \quad (53)$$

$$E[v(t_1)v^T(t_2)] = R\delta(t_1 - t_2) \quad (54)$$

From (27) z and h can be rewritten as $$z = \begin{bmatrix} \phi_R^1(t_R) \\ \vdots \\ \phi_R^i(t_R) \\ \vdots \\ \phi_R^N(t_R) \end{bmatrix} \quad (55)$$

$$h = \begin{bmatrix} \phi_B^i(t_B^1) + f_{sat}t_B^1 - f_m t_R - \phi_{0mR} + \phi_{0mB} \\ \vdots \\ \phi_B^i(t_B^i) + f_{sat}t_B^i - f_m t_R - \phi_{0mR} + \phi_{0mB} \\ \vdots \\ \phi_B^i(t_B^N) + f_{sat}t_B^N - f_m t_R - \phi_{0mR} + \phi_{0mB} \end{bmatrix} \quad (56)$$

However, the measurements going into the Kalman filter are the average difference, across the integration interval, between the replica phase and the incoming phase. Therefore, the measurement equation can be linearized around the propagated state vector as $$\delta z = \frac{\partial h}{\partial x}\bigg|_{x=x^-} \delta x + v \quad (57)$$

The derivation of the Kalman filter assumes the measurement noise is zero-mean white Gaussian. However, the nonlinear discriminator maps the zero-mean white Gaussian I and Q measurements into phase measurements where these assumptions are not necessarily met. This, along with the nonlinear nature of the measurement equations, makes the EKF suboptimal.

The matrix $$H = \frac{\partial h}{\partial x}$$

consists of N rows, where N is the number of satellites tracked, with the ith row given as $$H(i, \ldots) = \begin{bmatrix} \frac{\partial \phi_R^i}{\partial x} & \frac{\partial \phi_R^i}{\partial y} & \frac{\partial \phi_R^i}{\partial z} & \frac{\partial \phi_R^i}{\partial t_{B1}} & \frac{\partial \phi_R^i}{\partial \epsilon_2} \end{bmatrix} \quad (58)$$

Performing the partial derivatives and ignoring small effects due to SV Doppler, each row of H was calculated as $$H(i, \ldots) = f_{sat}\begin{bmatrix} \frac{e_x^i}{c} & \frac{e_y^i}{c} & \frac{e_z^i}{c} & 1 & \Delta T \end{bmatrix} \quad (59)$$

where $[e_x^i \; e_y^i \; e_z^i]$ equals a pointing vector from Rover to ith SV.

The phase discriminator is a four-quadrant arctangent since the navigation data bits are used. This discriminator limits the measurements to a half cycle on either side of zero. As in the scalar case with navigation data bits known, the total phase error from all sources (dynamics, clock error, noise, atmosphere mis-modeling, etc) must be kept less than this for all SVs in order to maintain vector phase lock. Maintaining the total error under a half cycle is easily done with proper design such as proper choice of clock, integration period length, atmospheric model, base station placement, etc. If the errors become larger than a half cycle across the integration period the effect will be similar to an uncorrected cycle slip in traditional methods. Due to the interpolations in translating the base station measurements to the rover, the base station measurements also must not have any cycle slips across the integration period. This is not a challenge for modern survey-grade receivers.

Figure 3:
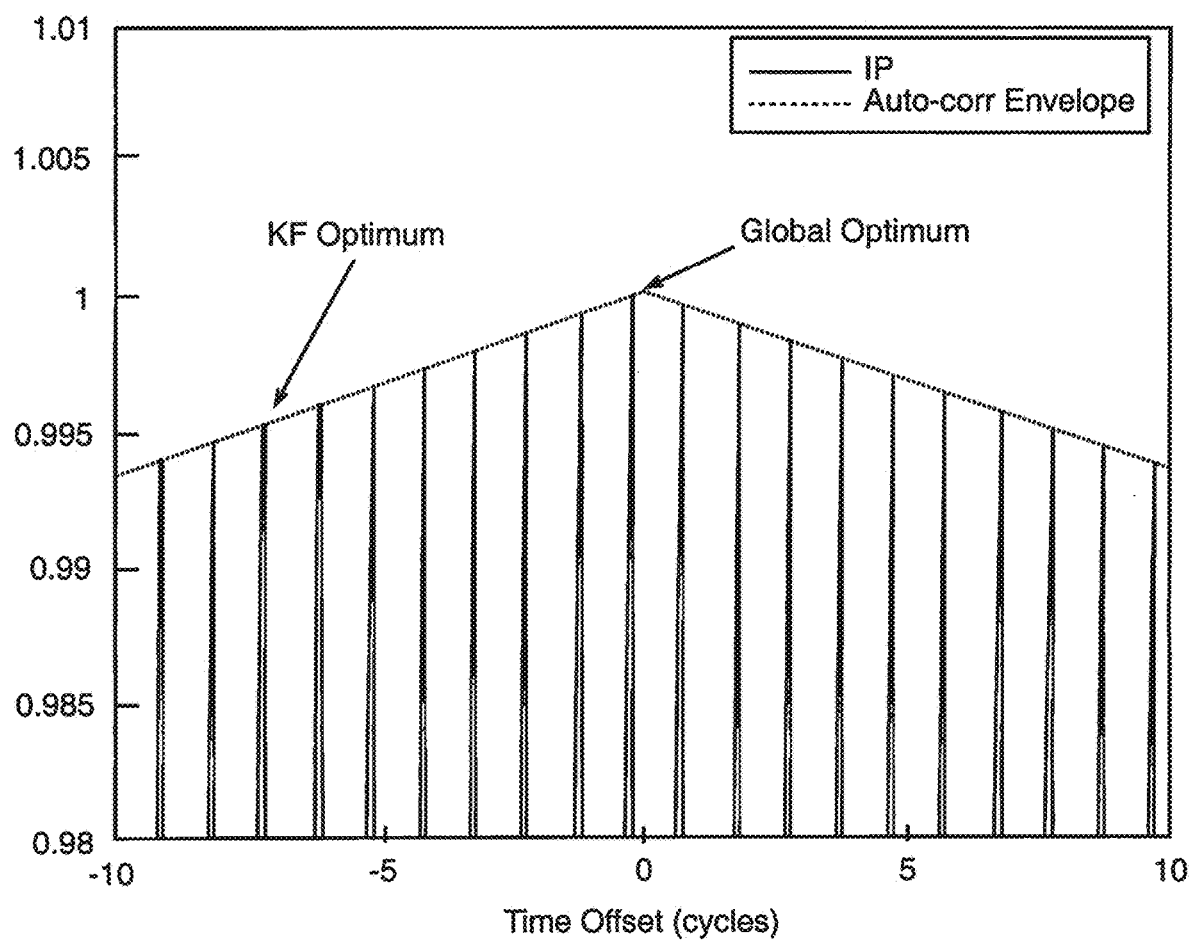
FIG. 3 illustrates initial Kalman filter convergence on a local optimum for the time offset that may result from errors in the estimate of the initial time offset.

Initially, the Kalman filter will converge on a local optimum for the time offset, as shown in FIG. 3, due to errors in the estimate of the initial time offset. To reach the global optimum, a normalized early-minus-late code discriminator is used. The sum, across all SVs, of the early, prompt, and late in-phase components are used to estimate the time offset error, in code chips, as $$IE_{sum} = \sum_{SV} IE^i \quad (60)$$

$$IP_{sum} = \sum_{SV} IP^i \quad (61)$$

$$IL_{sum} = \sum_{SV} IL^i \quad (62)$$

$$\Delta t_{B1} = \frac{1}{4} \frac{IE_{sum} - IL_{sum}}{IP_{sum}} \quad (63)$$

The tracking loop should be vector phase locked before the time offset error can be estimated. The time offset error is filtered and if greater than a cycle then the Kalman filter's time offset estimate is moved by the nearest integer carrier cycles toward the peak. It should be noted that the global optimum does not line up with zero time offset due to the arbitrary phase offset of the two receiver clocks and other differential phase errors. This same method was used, during tracking, to maintain the solution on the global peak.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

A specialized Transform-domain Instrumentation GPS Receiver (TRIGR) was developed for controlled reception pattern antenna (CRPA) research at the Air Force Institute of Technology. The front end has four separate L1 channels triggered off the same clock. The data, from each channel, were recorded at 56.32 MHz using 8-bit analog-to-digital converters. The mixer was at 1505.42 MHz bringing the signal down to 70 MHz and subsampling brought the signal down a further 56.32 MHz for a final baseband frequency, fb, of 13.68 MHz. The effective mixing frequency is then 1561.74 MHz and this is the value used for fm.

Figure 4:
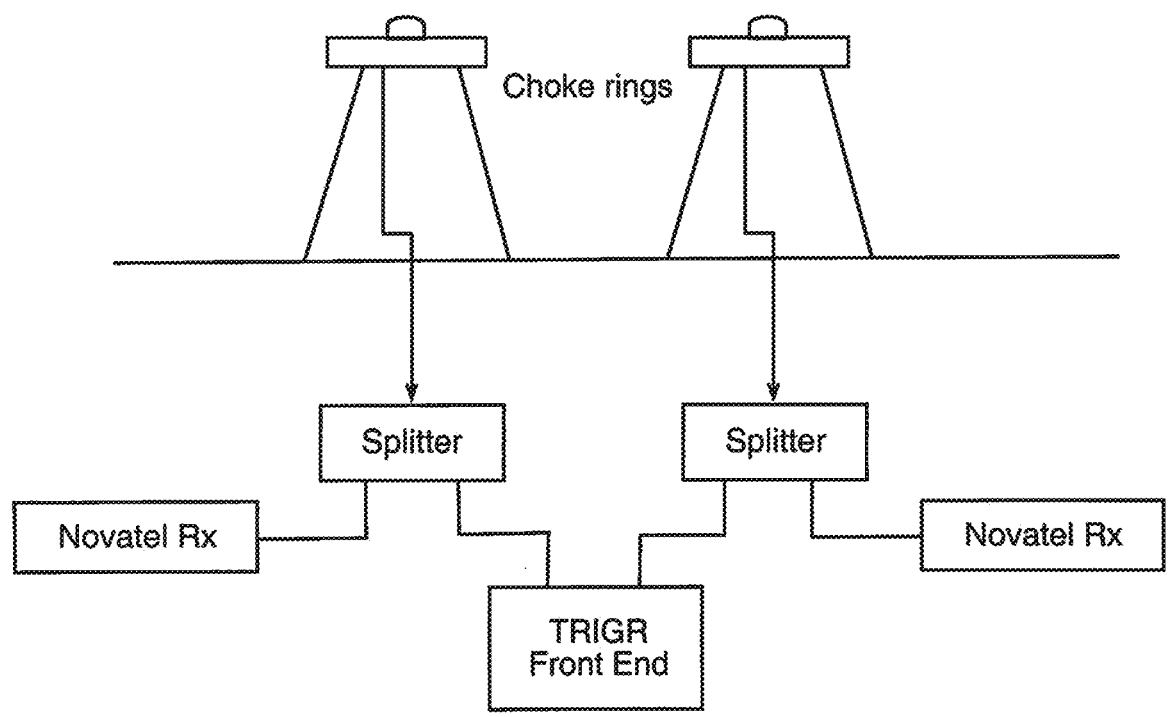
FIG. 4 illustrates a hardware configuration used for testing embodiments of the disclosed invention.

This TRIGR front end was used in a test to demonstrate the accuracy of the DVPLL method 10. The test was setup as shown in FIG. 4. Two chokering antennas were placed on a rooftop and the output of each was split and fed into a survey-grade receiver and into one channel of the TRIGR front end. Data were recorded from the Survey grade receivers for 24 hours, and sent to NGA's Online Positioning User Service (OPUS) to get survey coordinates.

Figure 5:
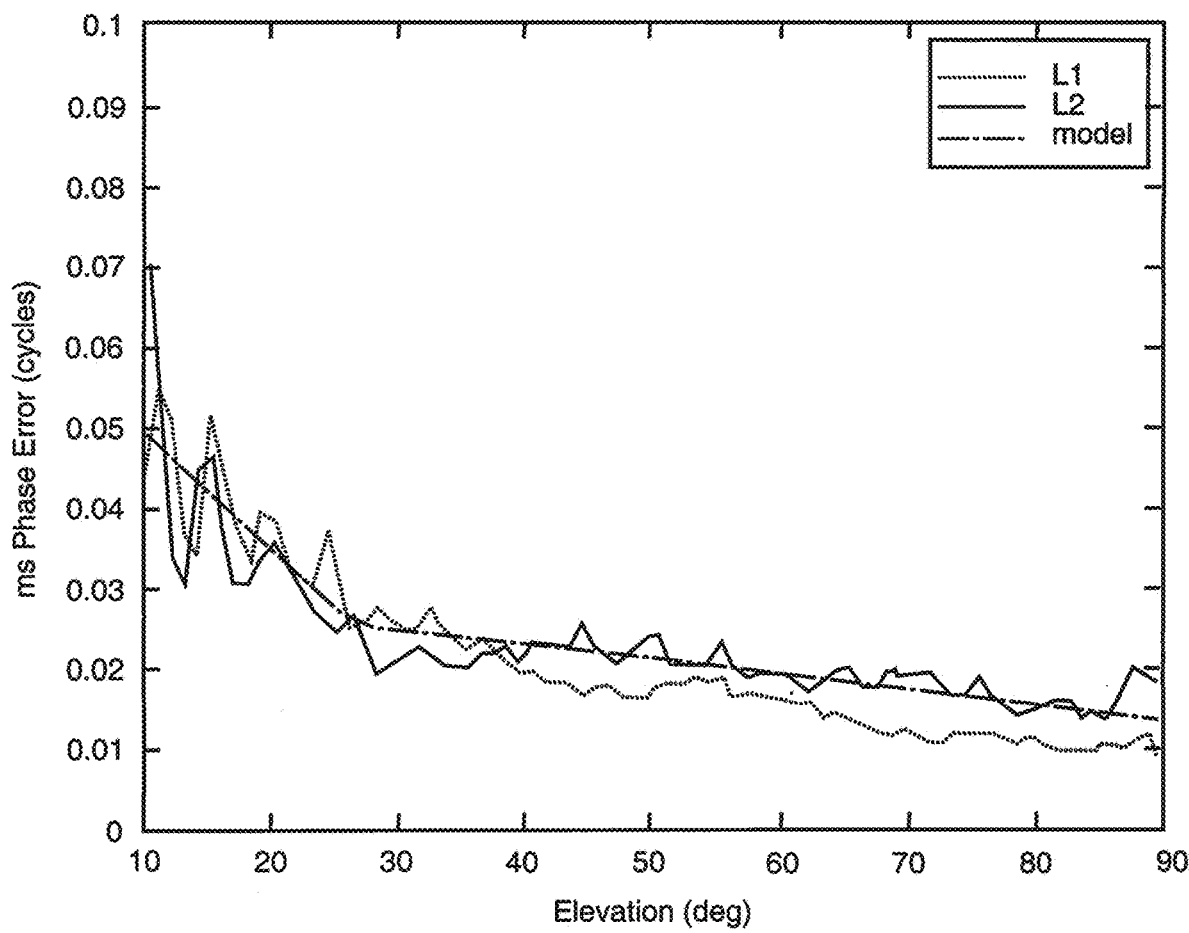
FIG. 5 depicts the root mean squared of phase residuals vs satellite vehicle elevation angle along with a parametrically derived function to approximate an L1 curve.

The 24-h Survey grade carrier-phase observations were reprocessed using the OPUS surveyed coordinates to get an estimate of the single-difference phase residuals. The rms of the resulting phase residuals vs SV elevation angle is plotted in FIG. 5 along with a parametrically derived function to approximate the L curve. The parametrically derived function was used to create the measurement covariance matrix, R. This simplistic realization of R is appropriate for the benign case presented herein. Under harsher conditions the model of the R matrix should be modified to account for other variables such as baseline length, dynamics, signal blockage, signal strength, etc.

The TRIGR front end and Survey grade receivers were used to collect 15 minutes of data.

The Survey grade receiver data were recorded at 4 Hz. The Survey grade receivers were not set up to collect the raw navigation data bits so the TRIGR data were processed using a conventional SW receiver to obtain the navigation data bits. The data were then processed using the DVPLL method 10 in two different modes. The first mode was a zero-baseline solution which used each survey grade receiver as the base station and the TRIGR channel corresponding to the same antenna as the rover. In this mode, the signal is the same up to the splitter, so all differential errors, except those due to receiver noise and receiver clocks, would be zero. The second mode was a short-baseline (18.5 m) solution which used each survey grade receiver as a base station and the TRIGR corresponding to the other antenna as the rover.

For testing embodiments of the disclosed invention, the DVPLL method 10 was initialized with the rover's surveyed position in order to easily prove the concept. In general, this information will not be available. The method could be initialized by performing traditional scalar tracking, resolving ambiguities, and handing off the resultant ambiguity resolved solution to the method. However, an acquisition method has been developed for the unique requirements of the DVPLL method 10 that does not require ambiguity resolution. The time bias state, $t_{B1}$, was initialized, using a high elevation satellite, as the difference of the two receiver's indicated times for a common code phase corrected for the difference in range. The frequency offset term $\epsilon_2$, was initialized as the difference of the two receiver's Doppler frequency estimates divided by the nominal satellite frequency.

Figure 6:
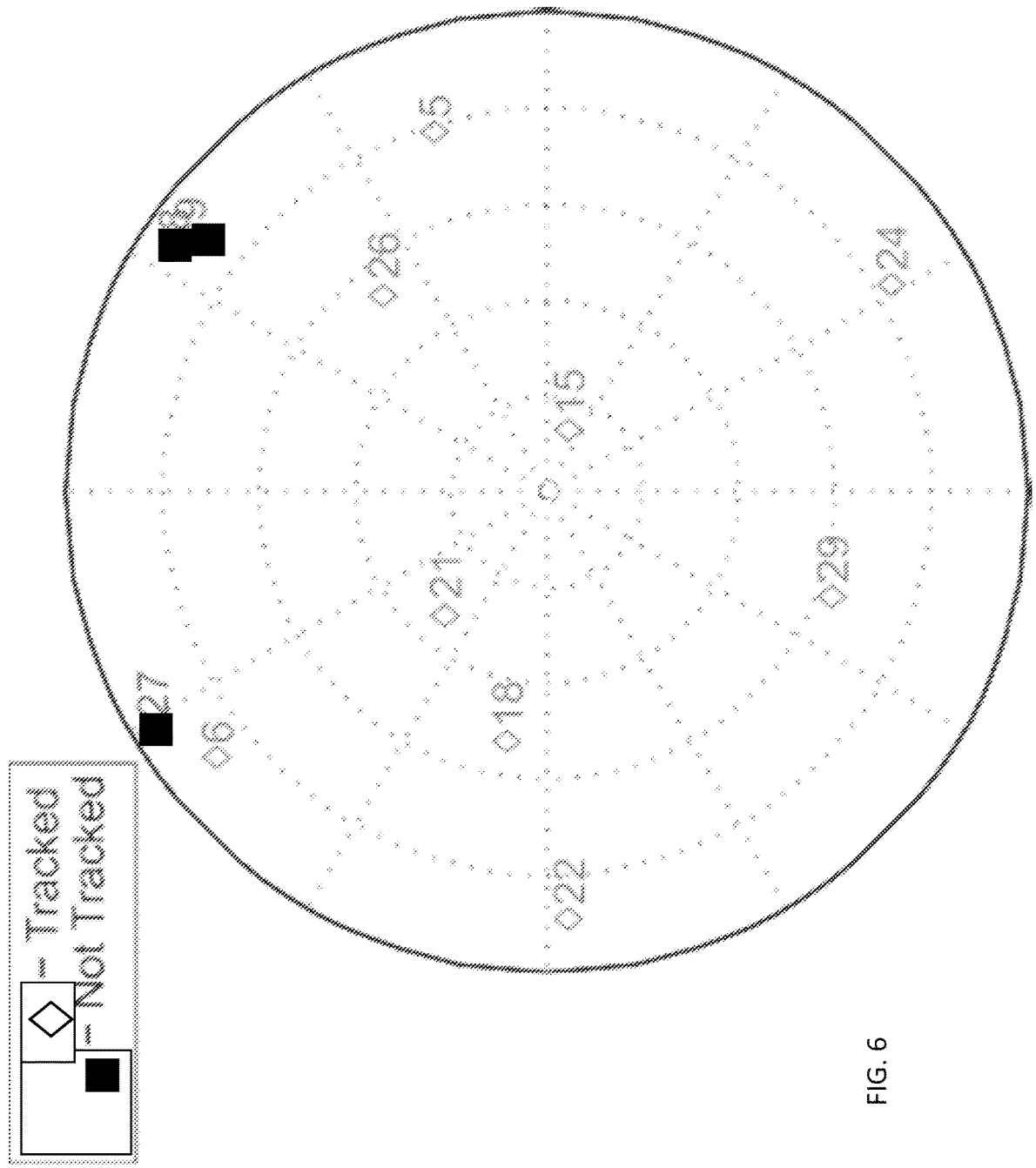
FIG. 6 shows a sky plot of the constellation at the time of the test.

FIG. 6 shows a sky plot of the constellation at the time of the test. Eight to nine satellites were above the 10 degree mask angle.

Figure 7:
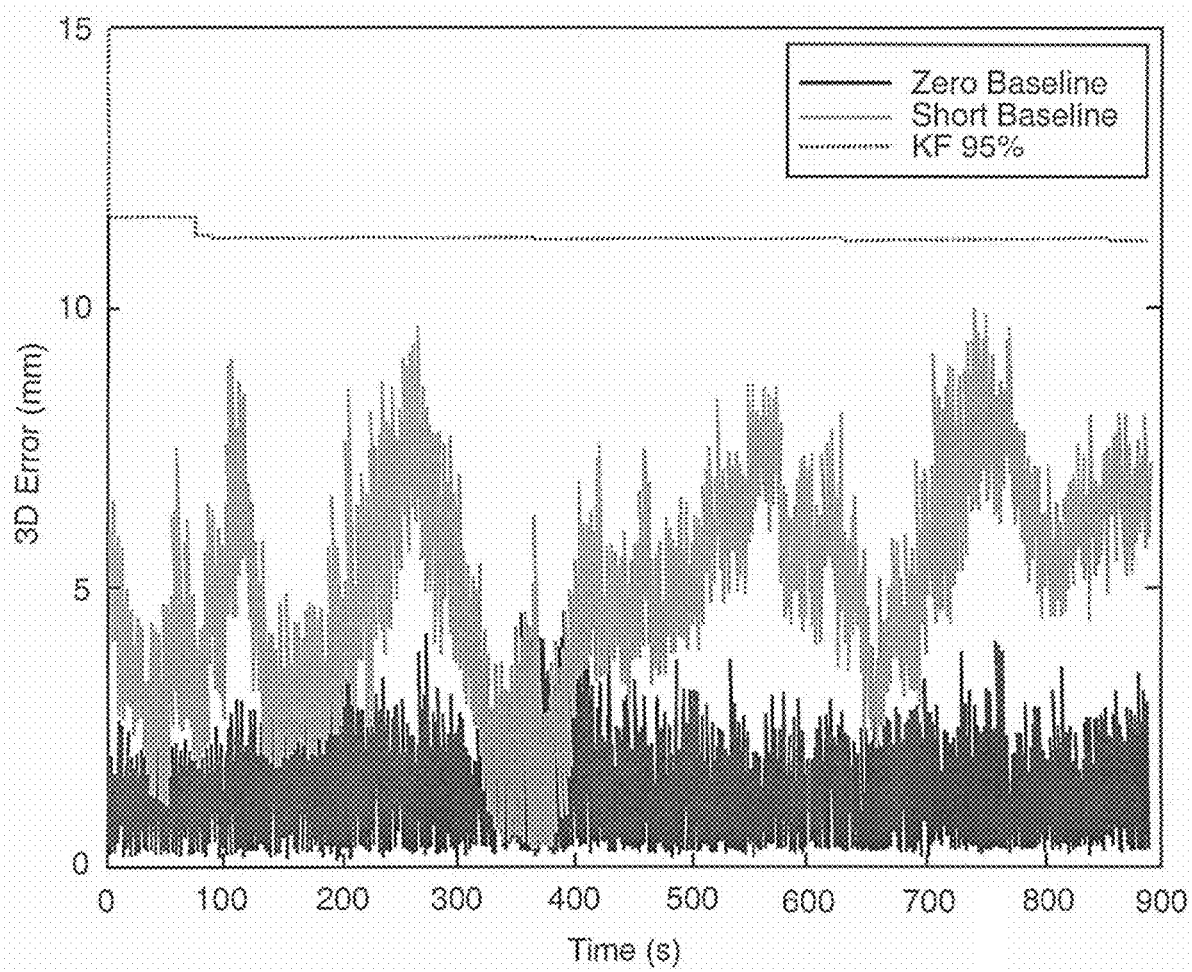
FIG. 7 shows a sample plot of the DVPLL 3D error versus time for each mode along with the filter's 95% error estimate.
Figure 8:
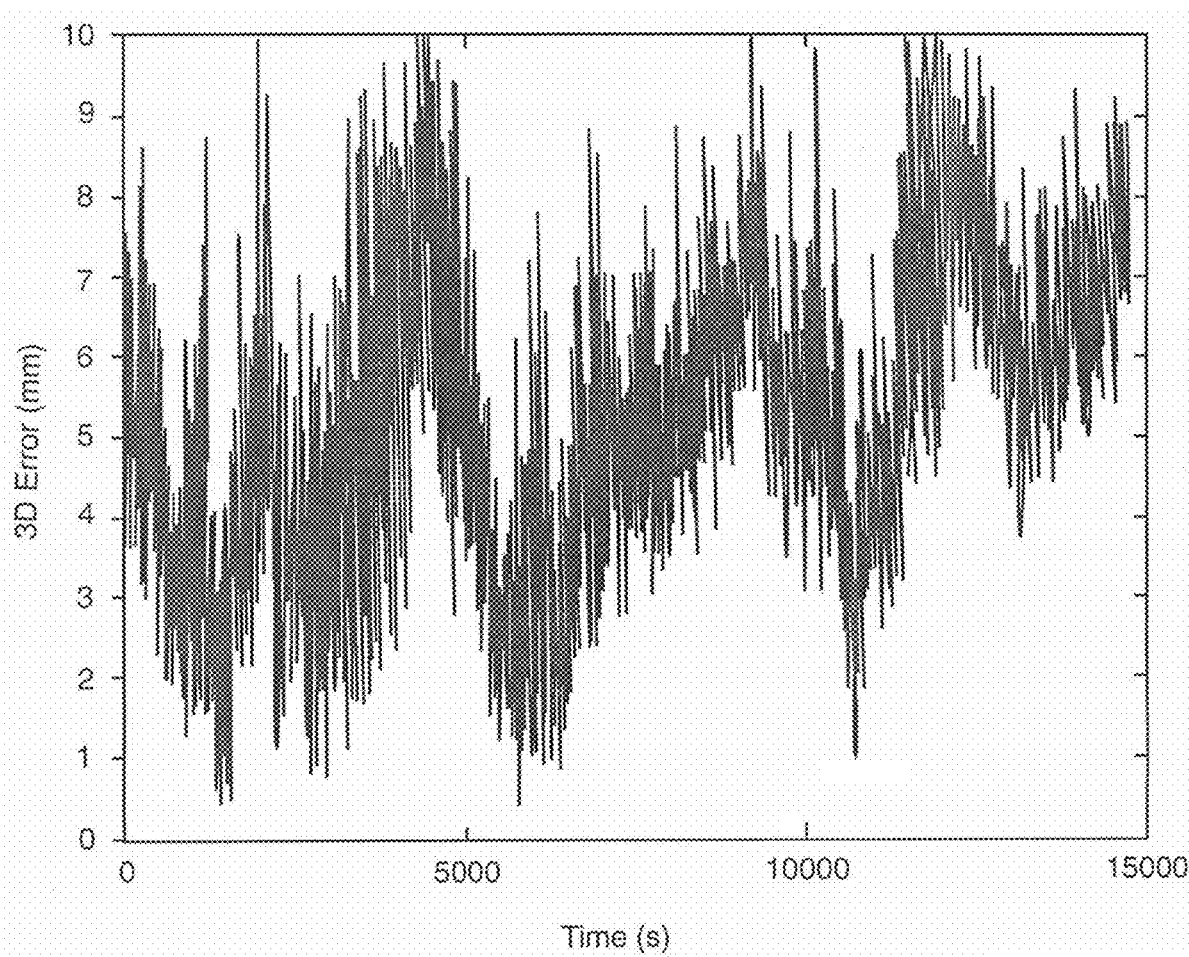
FIG. 8 shows 3D errors using two survey grade receivers processed as a single-difference ambiguity resolved solution for reference.
Figure 9:
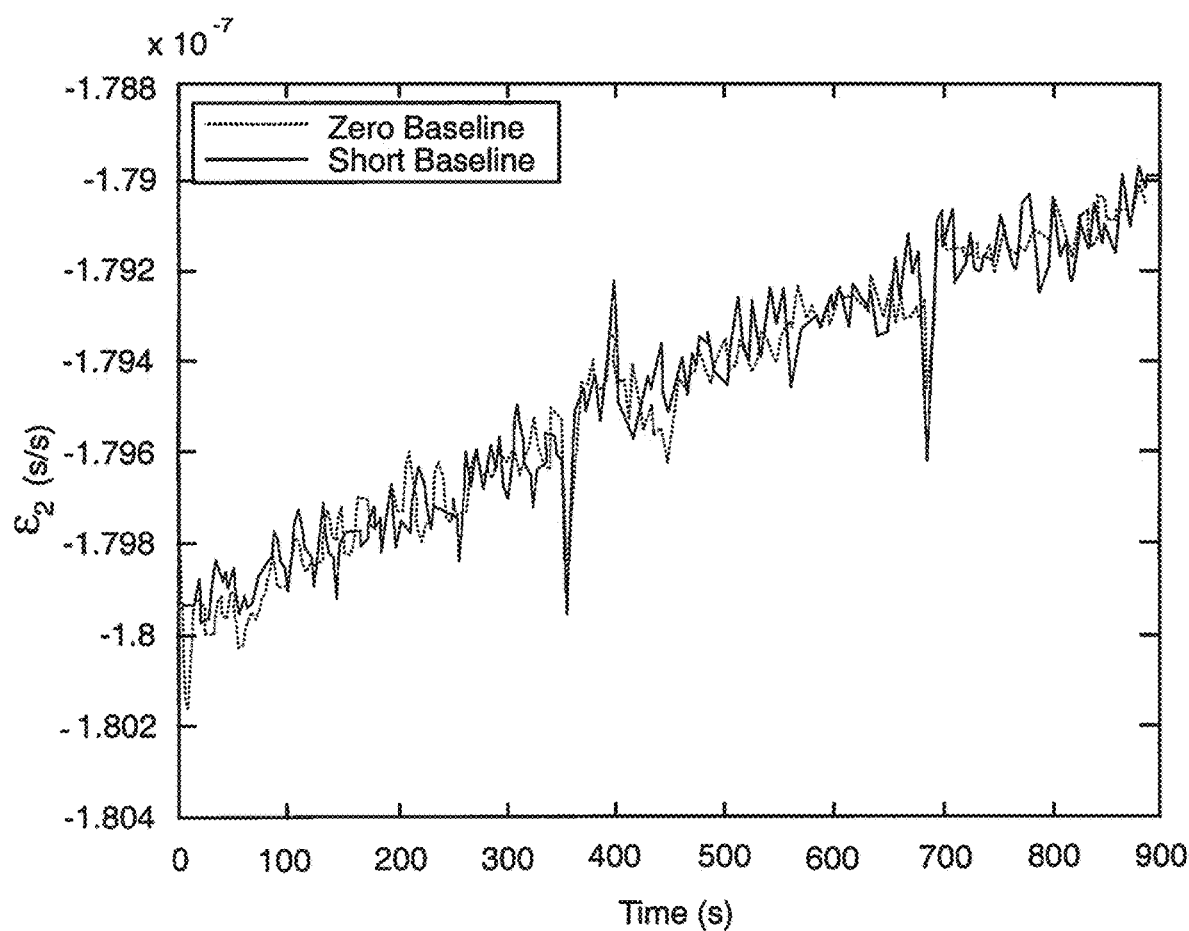
FIG. 9 plots a sample of the relative clock frequency offset terms, $\epsilon_2$, versus time for each mode.

FIG. 7 shows a sample plot of the DVPLL method 10 3D error versus time for each mode along with the filter's 95% error estimate. The overall rms of the 3D errors was approximately 1.3 mm for the zero baseline test and 5.3 mm for the short static baseline test which are comparable to an ambiguity-resolved differential carrier phase solution. This shows that the DVPLL method 10 clearly maintained vector phase lock on the correct solution. FIG. 8 shows the 3D errors using the two Survey grade receivers processed as a single-difference ambiguity resolved solution for reference. The error characteristics of the figures display similar low frequency content. The low-frequency errors are believed to be caused by multipath and/or the difference in antenna phase variations. FIG. 9 plots a sample of the relative clock frequency offset terms, E, versus time for each mode. FIG. 9 plots both processing modes using the TRIGR channel attached to the blue antenna as the rover. Thus the rover clock drift will be the same in each case and any difference in $\epsilon_2$, between processing modes, is solely due to the difference in clocks in the two Survey grade receivers used as base stations. Note that $\epsilon_2$ is approximately the same between processing modes. This is due to the Survey grade receiver's correction of measurement data for clock variations. The $-1.8 \times 10^{-7}$ s/s drift is comparable to the value expected of the OCXO used in the TRIGR front end giving high confidence the state was properly estimated.

The method was tested on GPS L1 measurements. However, nothing limits the method to a single frequency or type of GNSS signal. In fact, if correctly modeled, all available signals can be tracked in the same loop creating a highly robust solution. Additionally, given the number of measurements available, standard Kalman filter measurement residual monitoring techniques can be implemented.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for enhancing GPS location accuracy, the method comprising:
   providing a base station receiver having a known surveyed location;
   providing a roving receiver at a location distinct from the base station receiver;
   receiving single-frequency code and carrier-phase measurements from the base station;
   translating the single-frequency code and carrier-phase measurements to a Kalman filter-predicted location of the roving receiver;
   using the translated single frequency code and carrier phase measurements to generate a local replica of signals corresponding to the Kalman filter-predicted location for each channel of the roving receiver;
   correlating the local replicas with an incoming signal of the roving receiver to generate a plurality of tracking error estimates;
   using the plurality of tracking error estimates to update a plurality of navigation states and a plurality of clock update states thereof;
   estimating $\Delta t_{B1}$ defined by the difference of an initial time offset between a local Kalman filter optimum and a time offset of a global optimum; and
   discarding local channel information prior to performing subsequent iterations.

2. The method of claim 1, wherein the roving receiver includes stored values of a plurality of frequencies and a plurality of codes, and wherein a plurality of local replicas of the Kalman filter-predicted locations signals are applied to each of the plurality of frequencies.

3. The method of claim 2, wherein the step of translating the single-frequency code and carrier-phase measurements to a Kalman filter-predicted location of the roving receiver includes the steps of:
   creating an estimate of a time bias of a wave that would have passed the base station using an estimate of time and frequency offsets between the rover and the base station, a difference in range to a satellite between the rover and the base station, and a difference in modelled atmospheric errors for the rover and the base station;
   interpolating the base station's phase measurements using the time bias; and
   correcting the interpolated phase for a center frequency of the satellite and a mixing frequency of the receiver.

4. The method of claim 2, wherein the step of using the tracking error estimates to update the plurality of navigation states and the clock update states includes the steps of:
   creating rows of H using $$H(i, \ldots) = f_{scal} \begin{bmatrix} \dfrac{e_x^i}{c} & \dfrac{e_y^i}{c} & \dfrac{e_z^i}{c} & 1 & \Delta T \end{bmatrix};$$

and
   updating a plurality of navigation filter states using phase measurements determined in a plurality of discriminators.

5. The method of claim 2, wherein estimating $\Delta t_{B1}$ includes the steps of:
   allowing a navigation filter to settle on a local maximum for the $\Delta t_{B1}$;
   using in-phase early, prompt, and late correlator estimates in $$\Delta t_{B1} = \frac{1}{4} \frac{IE_{sum} - IL_{sum}}{IP_{sum}};$$

moving the $\Delta t_{B1}$ by a rounded number of integer cycles, after accounting for proper units, towards a global maximum; and
   monitoring $\Delta t_{B1}$ during a track to maintain lock on the global maximum.

* * * * *